United States Patent
Kubota

(10) Patent No.: US 6,215,558 B1
(45) Date of Patent: *Apr. 10, 2001

(54) DATA PROCESSING APPARATUS AND METHOD

(75) Inventor: Tsutomu Kubota, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/757,331

(22) Filed: Nov. 27, 1996

(30) Foreign Application Priority Data

Nov. 30, 1995 (JP) .................................................. 7-334358

(51) Int. Cl.$^7$ .................................................. G06F 15/00
(52) U.S. Cl. ........................ 358/1.15; 358/1.16; 358/1.13
(58) Field of Search ................................... 395/114, 112, 395/115, 116, 101, 117, 113; 358/261.3, 261.4, 262.1, 433, 1.11, 1.9, 1.2; 382/232, 233, 236, 239; 341/67, 87, 59, 95, 51

(56) References Cited

U.S. PATENT DOCUMENTS

| | | | |
|---|---|---|---|
| 3,980,809 | * 9/1976 | Cook | 358/433 |
| 5,434,568 | * 7/1995 | Moll | 341/87 |
| 5,600,316 | * 2/1997 | Moll | 341/87 |
| 5,617,517 | * 4/1997 | Chi | 395/114 |
| 5,649,074 | * 7/1997 | Welborn | 395/114 |
| 5,778,253 | * 7/1998 | Blair et al. | 395/114 |
| 5,894,544 | * 4/1999 | Heydinger | 358/1.15 |
| 5,963,716 | * 10/1999 | Welborn et al. | 358/1.15 |
| 6,124,940 | * 9/2000 | Heydinger | 358/1.15 |

* cited by examiner

*Primary Examiner*—Dov Popovici
(74) *Attorney, Agent, or Firm*—Fitzpatrick, Cella, Harper & Scinto

(57) ABSTRACT

Image data sent from a parallel I/F circuit is compressed by a compression circuit body. A data counter counts the number of bytes of image data of the same data elements and counts the data amount of image data of different data elements. An operation circuit calculates control data in accordance with the count of the data counter. When an output of the compression circuit body changes from image data of the same data elements to image data of different data elements, or vice versa, a first selector outputs not the image data but the control data. Compressed image data with the control data added to the end of the compressed image data is transferred to a storage device.

12 Claims, 11 Drawing Sheets

FIG. 5A

ADDRESS →

| A | B | C | C | C | C |
|---|---|---|---|---|---|
| C | D | E | E | E | F |
| F | F | F | F | F | F |
| F | G | H | I | J | K |
| K | K | K | K | K |   |

ADDRESS ↓

FIG. 5B

ADDRESS →

| A | B | COMMAND 1 | C | COMMAND 2 | D |
|---|---|---|---|---|---|
| COMMAND 3 | E | COMMAND 4 | F | COMMAND 5 | G |
| H | I | J | COMMAND 6 | K | COMMAND 7 |
|   |   |   |   |   |   |

ADDRESS ↓

FIG. 11A PRIOR ART

| | | ADDRESS → | | | |
|---|---|---|---|---|---|
| A | B | C | C | C | C |
| C | D | E | E | E | F |
| F | F | F | F | F | F |
| F | G | H | I | J | K |
| K | K | K | K | K | |

ADDRESS ↓

FIG. 11B PRIOR ART

| | | ADDRESS → | | | |
|---|---|---|---|---|---|
| COMMAND 1 | A | B | COMMAND 2 | C | COMMAND 3 |
| D | COMMAND 4 | E | COMMAND 5 | F | COMMAND 6 |
| G | H | I | J | COMMAND 7 | K |
| | | | | | |

ADDRESS ↓

DATA PROCESSING APPARATUS AND METHOD

BACKGROUND OF THE INVENTION

1. Field of the Invention

The present invention relates to a print control apparatus and method of compressing/expanding image data and printing it.

2. Related Background Art

A data compression method called a pack bit data compression method is known for compressing image data transmitted from an information processing apparatus such as a host computer to a print control apparatus.

With the pack bit data compression method, image data of each byte is checked whether or not it is formed by the same data elements. As shown in FIG. 10A, if the image data of each byte is formed by the same data elements, the number of bytes of the same data elements is written in a one byte control unit 51, and the same data element byte which occurs that number of times is written in a one byte data unit 52. If the image data of each byte is formed by different data elements, as shown in FIG. 10B, the number of bytes of the different data elements is written in a one byte control unit 53, and the different data elements of one or more bytes are written in a data unit 54 containing those one or more bytes.

FIG. 11A shows an example of non-compressed image data transmitted from the host computer, the image data being shown in units of bytes. FIG. 11B shows the non-compressed image data shown in FIG. 11A, as compressed by the pack bit compression method. With the pack bit compression method, immediately before the two bytes of different data "A" and "B", control data "command 1" indicating the number (two) of bytes of different data elements is written. Immediately before five consecutive bytes of the same image data "C", control data "command 2" indicating the number of bytes (five) of the same data elements is written. Similarly, control data indicating the number of bytes of the same or different data elements is written immediately before each such byte or set of bytes.

With the conventional pack bit compression method used with a print control apparatus, however, in order to count the number of bytes of different data elements transmitted from the host computer, it is necessary to temporarily store the bytes of different data elements in a buffer or a memory area different from the data unit 54, and to transfer the bytes stored in the buffer or the like to the data unit 54 after the control data indicating the number of counted bytes is written in the control unit 53. Specifically, in the example shown in FIG. 11B, in order to generate the control data "command 6" indicating the number of bytes of different data elements "G", "H", "I", and "J", it is necessary to detect a transition from bytes of the different data elements to bytes of same data elements. Therefore, after the different data elements "G", "H", "I", and "J" are received, it is necessary to receive a plurality of bytes of the same data elements "K" in order to detect the transition and generate the control data "command 6". A buffer having a capacity sufficient for temporarily storing image data becomes necessary, increasing the load on the apparatus.

In another method of counting the number of bytes of different data elements, the image data is written in the data unit 54 by DMA (direct memory access) without writing the control data in the control unit 53, and when a transition is detected, the address is returned to the control unit 53 to write the control data therein. With this method, however, to write the control data in the control unit 53 in this fashion (after writing the image data in the data unit 54), it is necessary to control the write address counter to return to the address of the control unit 53. This method therefore requires a complicated operation.

SUMMARY OF THE INVENTION

The invention has been made under the above circumstances. It is an object of the present invention to provide a print control apparatus and method capable of simplifying the structure and processes without degrading conventional image processing functions.

According to one aspect of the invention, there is provided a data processing apparatus in which input data is analyzed and the input data is compressed by distinguishing repeat data which repeats same element from nonrepeat data which repeats different element as to the input data, comprising: generating means for generating control data indicating the repeat data if the input data is the repeat data and control data indicating the nonrepeat data if the input data is the nonrepeat data; and compressing means for generating nonrepeat compression data by outputting the input data corresponding to the nonrepeat data sequentially outputting the control data generated by the generating means if the input data is the nonrepeat data, and for generating repeat compression data by outputting the input data corresponding to the repeat data and outputting the control data generated by the generating means if the input data is the repeat data.

According to another aspect of the present invention, there is provided a data processing method in which input data is analyzed and the input data is compressed by distinguishing repeat data which repeats same element from nonrepeat data which repeats different element as to the input data, comprising the steps of: generating control data indicating the repeat data if the input data is the repeat data and control data indicating the nonrepeat data if the input data is the nonrepeat data; and generating nonrepeat compression data by outputting the input data corresponding to the nonrepeat data sequentially outputting the control data generated in the generating step if the input data is the nonrepeat data, and for generating repeat compression data by outputting the input data corresponding to the repeat data outputting the control data generated in the generating step if the input data is the repeat data.

The other objects and advantages of the present invention will become apparent from the following detailed description of embodiments when read in conjunction with the accompanying drawings.

BRIEF DESCRIPTION OF THE DRAWINGS

FIGS. 5A and 5B are memory maps showing compressed and non-compressed image data written in an RAM.

FIGS. 11A and 11B are memory maps of an RAM showing compressed and non-compressed image data written by conventional techniques.

DETAILED DESCRIPTION OF THE PREFERRED EMBODIMENTS

Figure 1:
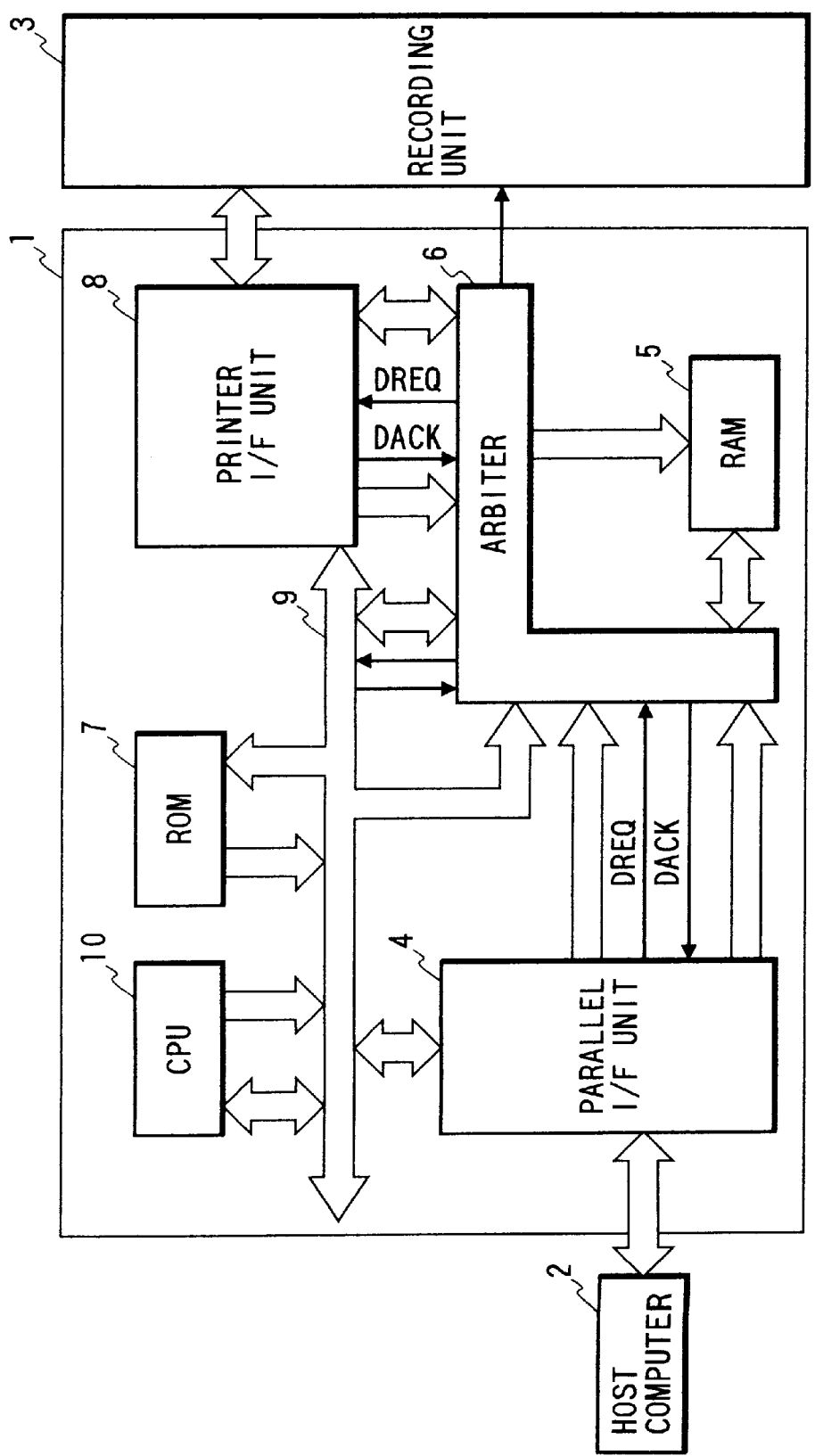
FIG. 1 is a block diagram showing the structure of a print control apparatus according to a first embodiment of the invention.

FIG. 1 is a block diagram showing the structure of a print control apparatus according to the first embodiment of the invention. A print control apparatus 1 is connected between a host computer 2 from which image data is supplied and a recording unit 3 to which image data is supplied to print it out.

The print control apparatus 1 has a parallel interface (I/F) unit 4 for receiving image data (parallel data) of 8 bits from the host computer 2, a RAM 5 for storing image data sent from the host computer 2, an arbiter 6 for arbitrating an access to RAM 5, a ROM 7 for storing predetermined programs, a printer I/F unit 8 for sequentially sending print data (serial data) one bit after another to the recording unit 3, and a CPU 10 connected to the above circuit constituents via a bus 9 to control the whole apparatus.

Figure 2:
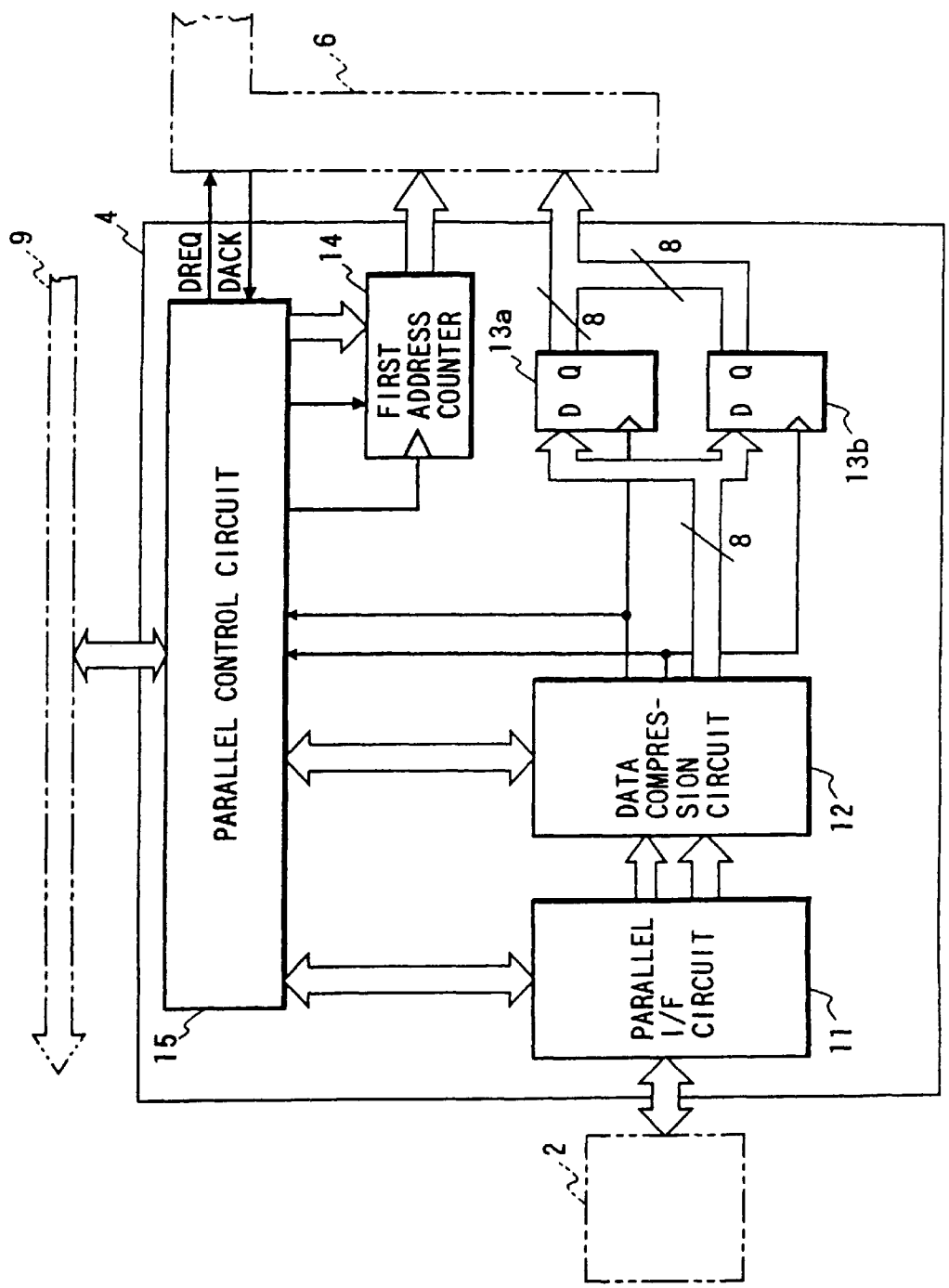
FIG. 2 is a block diagram showing the details of a parallel I/F unit of the first embodiment.

The parallel I/F unit 4 includes, as shown in FIG. 2, a parallel I/F circuit 11 for interface with the host computer 2, a data compression circuit 12 for compressing image data received by the parallel I/F circuit 11, a pair of compressed data registers 13a and 13b for loading image data compressed by the data compression circuit 12 in units of words (1 byte=8 bits), a first address counter 14 for outputting a DMA address, and a parallel control circuit 15 connected to these circuit constituents to control the whole I/F unit 4. The parallel control circuit 15 has a DMA circuit by which data transfer is executed.

Figure 3:
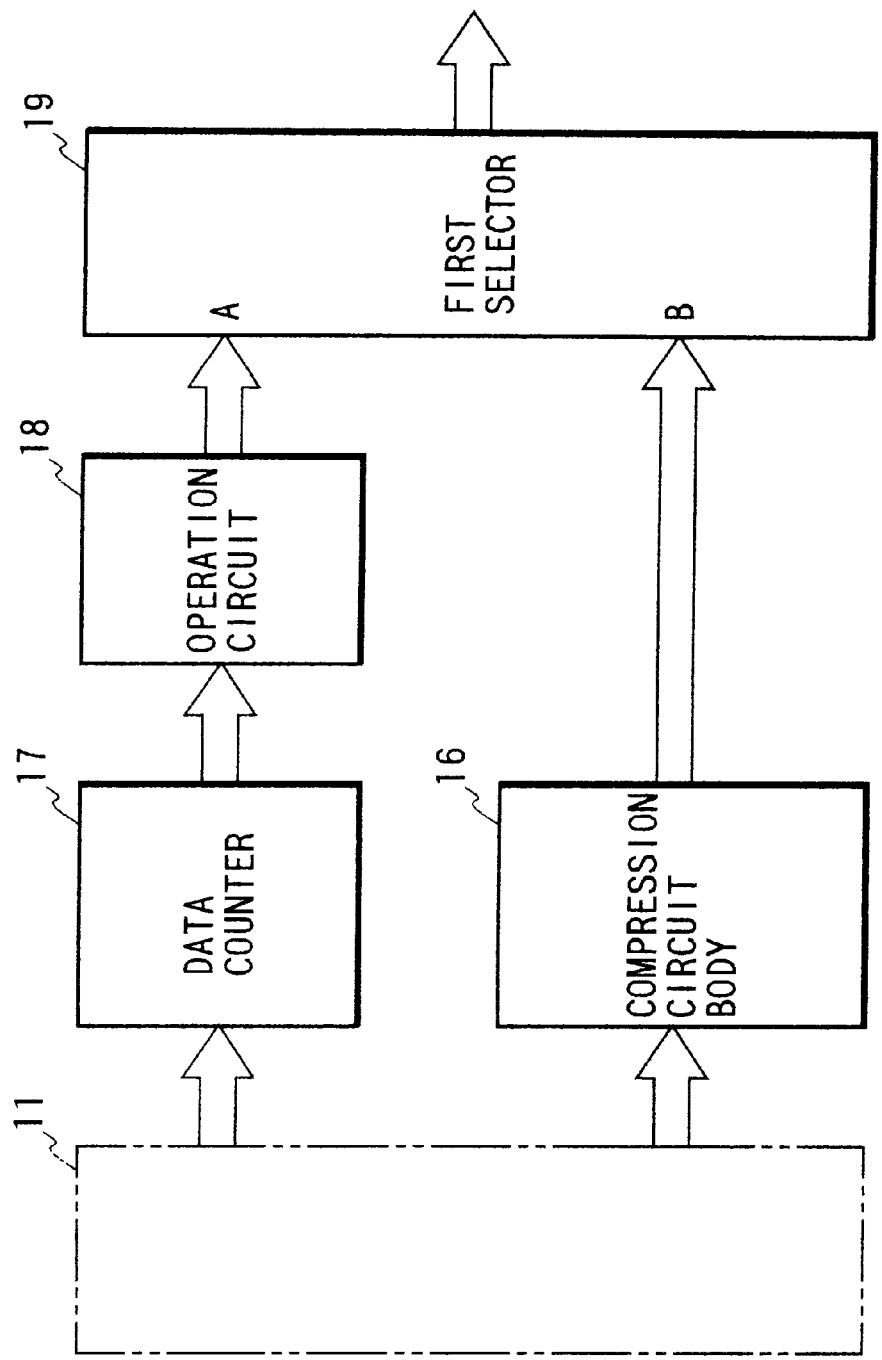
FIG. 3 is a block diagram showing a data compression circuit of the first embodiment.

The data compression circuit 12 includes, as shown in FIG. 3, a compression circuit body 16 for compressing image data output from the parallel I/F circuit 11, a data counter 17 for counting the number of bytes of the same data elements or different data elements, an operation circuit 18 for calculating control data in accordance with the count of the data counter 17, and a first selector 19 for selectively outputting either the control data from the operation circuit 18 or the compressed image data of output from the compression circuit body 16. In this data compression circuit 12, the image data made up of the same or of different data elements supplied from the compression circuit body 16 is output via port B of the first selector 19, and the control data from the operation circuit 18 is output via port A of the first selector when the image data from the compression circuit body 16 changes from a byte of a series of bytes of the same data elements to a byte of the different data elements, or vice versa.

Figure 4:
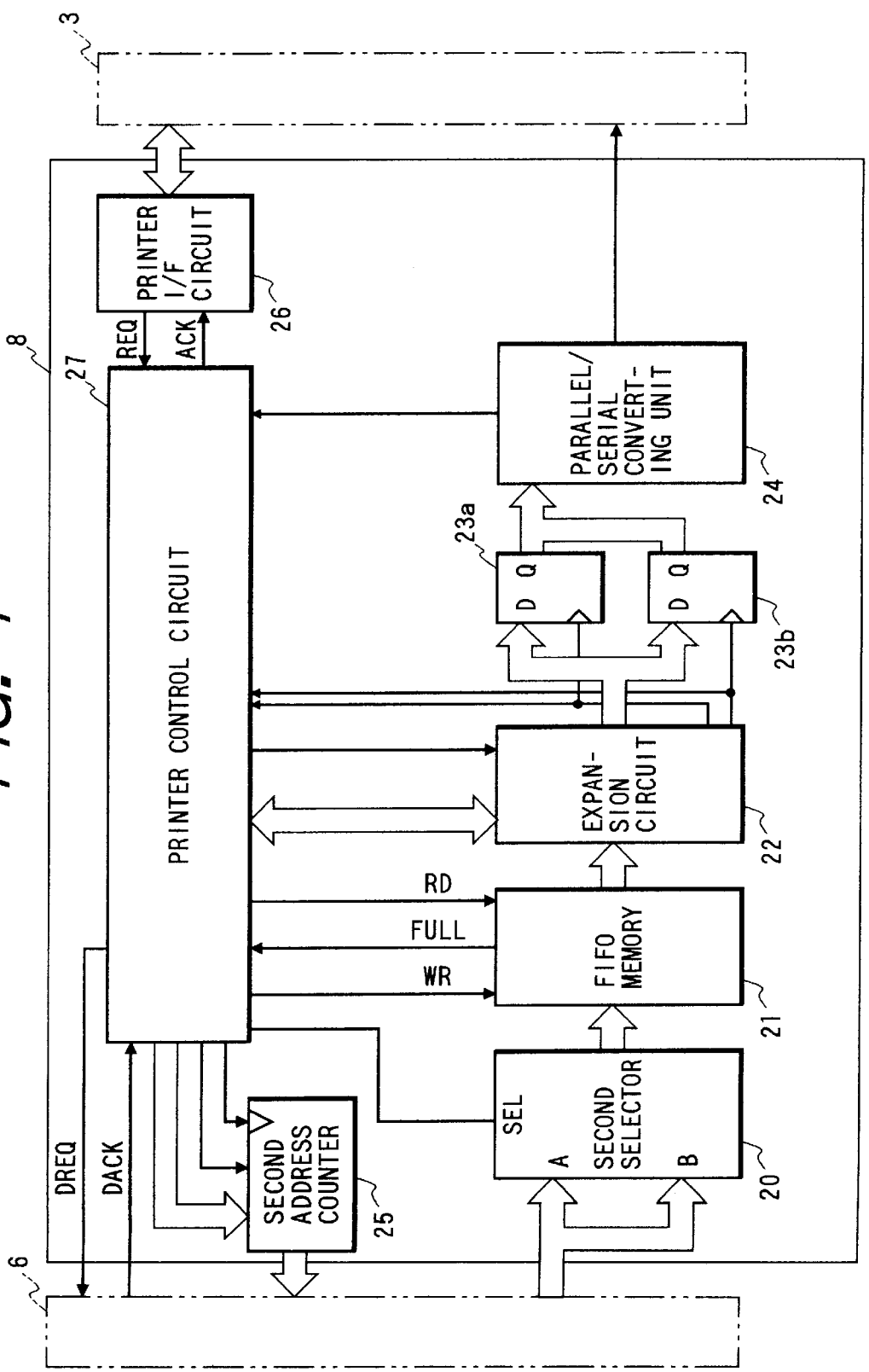
FIG. 4 is a block diagram showing the details of a printer I/F unit of the first embodiment.

The printer I/F unit 8 includes, as shown in FIG. 4, a second selector 20 for dividing word data of 16 bits into two sets of word data of 8 bits, a FIFO (First-In First-Out) memory 21 capable of storing data of plural bytes for processing data output from the second selector in a priority order of data input, an expansion circuit 22 for expanding data output from the FIFO memory 21, a pair of expanded data registers 23a and 23b for storing data expanded by the expansion circuit 22, a parallel/serial converting unit 24 for converting the expanded image data (parallel data) output from the expanded data registers 23a and 23b into serial print data of one bit and time sequentially outputting the print data, a second address counter for counting a DMA address, a printer I/F circuit 26 for interface with the recording unit 3, and a printer control circuit 27 connected to the above circuit constituents for controlling the whole printer I/F unit 8. The printer control circuit 27 has a DMA circuit which executes data transfer.

Next, the operation of the print control apparatus will be described with reference to FIGS. 1 and 2, the operation including receiving and compressing parallel image data of 8 bits transmitted from the host computer 2 and transferring the compressed image data by DMA to RAM 5.

Under the control of the parallel control circuit 15, image data of the same or different data elements transmitted from the host computer 2 is received by the parallel I/F circuit 11 of the parallel I/F unit 4 and compressed by the data compression circuit 12. Under the control of the parallel control circuit 15, the compressed image data is written in the first data registers 13a and 13b. At this time, a write signal for the first data registers 13a and 13b is input to the parallel control circuit 15. Since the bus 9 is a 16-bit bus, two data registers 13a and 13b each having an 8-bit capacity are used.

After the compressed image data is completely written in the first data registers 13a and 13b, the parallel control circuit 15 outputs a DMA request signal DREQ to the arbiter 6. Upon reception of the DMA request signal DREQ, the arbiter 6 arbitrates memory accesses requested by CPU 10 and the printer I/F unit 8 connected to the bus 9, and writes the compressed image data of 16 bits stored in the first and second data registers 13a and 13b into RAM 5 at a memory area designated by an address supplied from the first address counter 14. After the compressed data is completely written in RAM 5, the arbiter 6 outputs a DMA acknowledge signal DACK to the parallel control circuit 15. Upon reception of the DMA acknowledge signal DACK, the parallel control circuit 15 clears the DMA request signal DREQ.

In the series of operations described above, if the image data is received from the host computer 2, the parallel control circuit 15 controls the parallel I/F circuit while monitoring the operation of the data compression circuit 12. For example, if the image data of the same data elements is received, the data compression circuit 12 supplies a write signal to the first data registers 13a and 13b to read once the image data of the same data elements, thereafter the parallel I/F circuit 11 sequentially receives succeeding image data of the same data elements while it is transmitted from the host computer 2. When a predetermined number (e.g., 128) of bytes of the same or different data elements are received, a predetermined control data is written in the first data registers 13a and 13b. In this manner, two bytes are written in the first data registers 13a and 13b. The parallel control circuit 15 then outputs the DMA request signal DREQ to the arbiter 6, and after the DMA acknowledge signal DACK is received, it clears the DMA request signal DREQ and increments the first address counter 14.

The compression operation of the data compression circuit 12 will be described with reference to FIGS. 3, 5A, and 5B.

FIG. 5A shows an example of non-compressed image data transmitted from the host computer 2, the non-compressed image data "A", "B", "C", . . . being shown in units of bytes and input in this order to the compression circuit body 16. The compression circuit body 16 can store non-compressed image data of three bytes. When the next byte of image data "C" is input, the top bytes "A" stored in the compression circuit body 16 is output via the first selector 19. In this case, the image data "A" is judged, from the image data stored in the compression circuit body, as part of a series of bytes of different data elements, so that the data counter 17 counts "1".

Next, when the next byte of image data "B" is input, the image data "B" is output and the data counter 17 counts "2". It can be judged from the image data stored in the compression circuit body 16 that the series of bytes of different data elements discontinues at this time. Therefore, in accordance with the count "2" of the data counter 17, the operation circuit 18 outputs from the first selector 19 the control data indicating two consecutive bytes of different data elements.

When the next image data "C" is input, the top bytes data "C" stored in the compression circuit body 16 is output and the data selector 17 counts "1".

Although the image data "C" is input twice thereafter, the image data is not output from the compression circuit body 16 because it has been judged that these image data "C" are made of the same data elements, and the data counter 17 counts "2" and "3". When the image data "D" and "E" are input to the compression circuit body 16 and the data counter 17 counts "4" and "5", the image data "C" of the same data elements discontinues. In accordance with the count "5" of the data counter 17, control data indicating five consecutive bytes of the same data elements is generated by the operation circuit 18 and output via the selector 19.

The data shown in FIG. 5B is eventually output.

Next, the operation of reading image data stored in RAM 5 by DMA, expanding the compressed data, and outputting the expanded data to the recording unit 3 will be described with reference to FIG. 4.

CPU 10 sets a start address to the second address counter 25 to activate DMA, and the printer control circuit 27 outputs a DMA request signal DREQ to the arbiter 6. When a DMA acknowledge signal DACK is send by the arbiter 6, the second selector 20 is alternately switched to write word data of 16 bits into the FIFO memory 21, 8 bits at a time, and the count of the second address counter 25 is incremented.

The printer control circuit 27 executes again DMA to write compressed image data in the FIFO memory 21 if the FIFO memory 21 has an empty area of two bytes or larger.

Next, CPU 10 activates the expansion circuit 22. As the expansion circuit 22 is activated, it reads the compressed data stored in the FIFO memory 21 and expands it and writes it in the second data registers 23a and 23b. After the expanded image data of two bytes is written in the second data registers 23a and 23b, the printer control circuit 27 intercepts the operation of the expansion circuit 22.

Next, upon reception of a data request signal REQ from the printer I/F circuit 26, the printer control circuit 27 sends the expanded data stored in the second data registers 23a and 23b to the parallel/serial converting unit 24 and resumes the intercepted operation of the expansion circuit 22 to again store the expanded image data in the second data registers 23a and 23b. The image data input to the parallel/serial converting unit 24 is parallel/serial converted and output as print data to the recording unit 3.

In expanding the compressed image data written in RAM 5 such as shown in FIG. 5B, data processing starts from the control data "command 7". In outputting data from the parallel/serial converting unit 24 to the recording unit 3, print data is output to the recording unit 3, starting from the image data "K" for the "command 7" while sequentially decrementing the address.

In the first embodiment, the image data of different data elements, for example, "G", "H", "I", and "J" is sequentially written into RAM 5 and thereafter the control data "command 6" for the image data is written in RAM 5. Therefore, image data is not required to be loaded once in a buffer as in conventional cases, and complicated operations such as counting back the address counter, as in conventional cases, are not necessary. The apparatus can thus be simplified.

In this embodiment, compressed and expanded image data is output from a printer. The image data may be output from other output devices such as a display by using the compression method of this invention.

Figure 6:
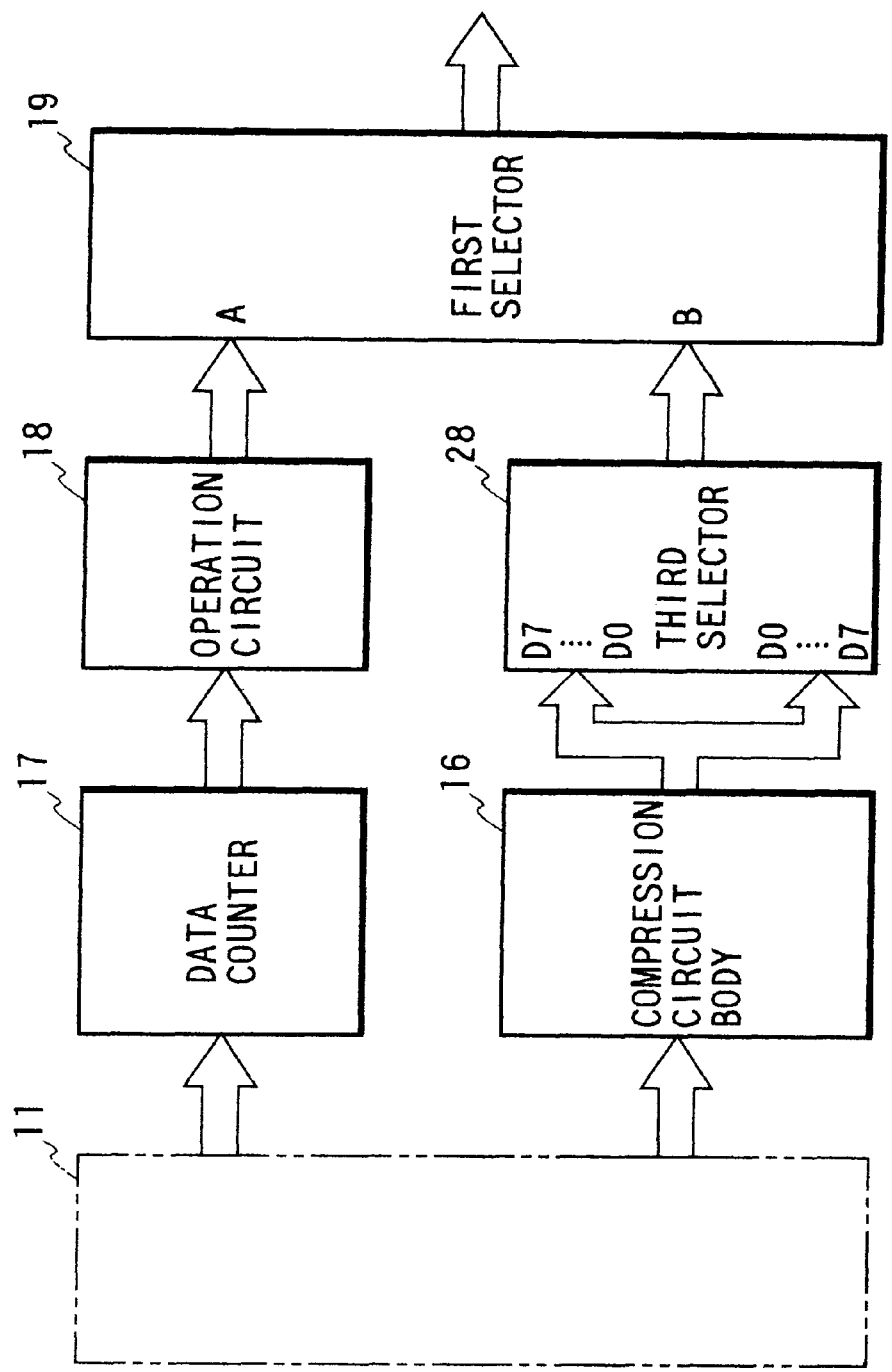
FIG. 6 is a block diagram showing a data compression circuit according to a second embodiment of the invention.

FIG. 6 is a block diagram showing the main part of the second embodiment. In this embodiment, a third selector 28 is connected between the compression circuit body 16 of the data compression circuit and the first selector 19. The third selector 28 mirror-inverts (data exchange between LSB and MSB) image data of 8 bits.

In the second embodiment, image data is sequentially output starting from the last image data "K". The third selector 28 mirror-inverts each bit of the image data of one byte to sequentially output the image data to the recording unit 3.

Figure 7:
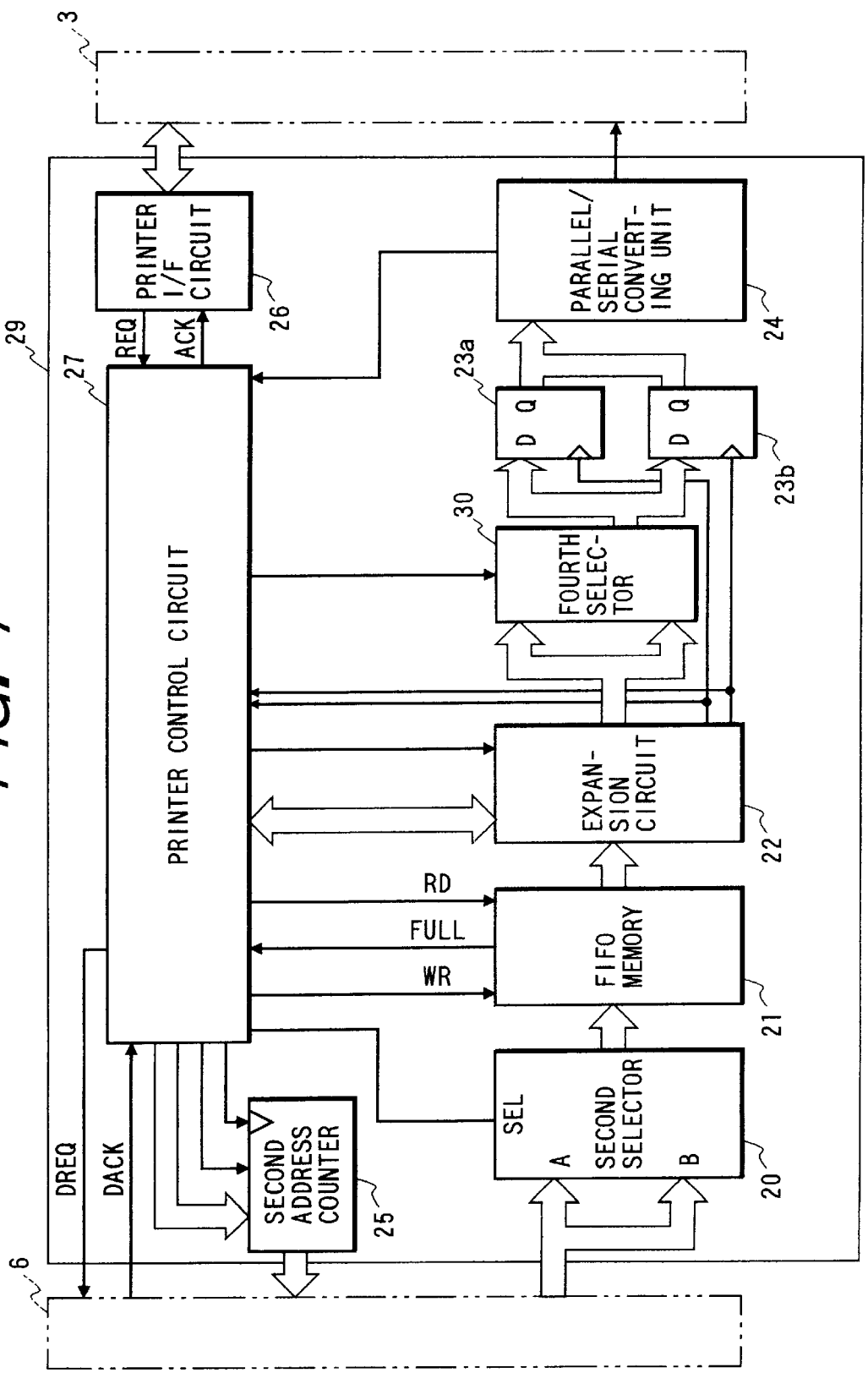
FIG. 7 is a block diagram showing the details of a printer I/F unit according to a third embodiment of the invention.

FIG. 7 is a block diagram showing the main part of the third embodiment. In this embodiment, a fourth selector 30 is connected between the expansion circuit 22 of the printer I/F unit 29 and the second data registers 23a and 23b.

In the third embodiment, in place of the third selector 28 of the data compression circuit of the second embodiment, the fourth selector 30 is provided in the printer I/F unit 29 to execute a mirror-conversion process similar to the third selector 28.

Specifically, the expansion circuit 22 expands the output data of the FIFO memory 21, and outputs the expanded data of 8 bits to the fourth selector 30. The fourth selector 30 mirror-inverts the expanded data and outputs it to the second data registers 23a and 23b. The second registers 23a and 23b write the data in response to the data write signal from the expansion circuit 22. The data written in the second data registers 23a and 23b is output via the parallel/serial converting unit 24 to the recording unit 3.

Figure 8:
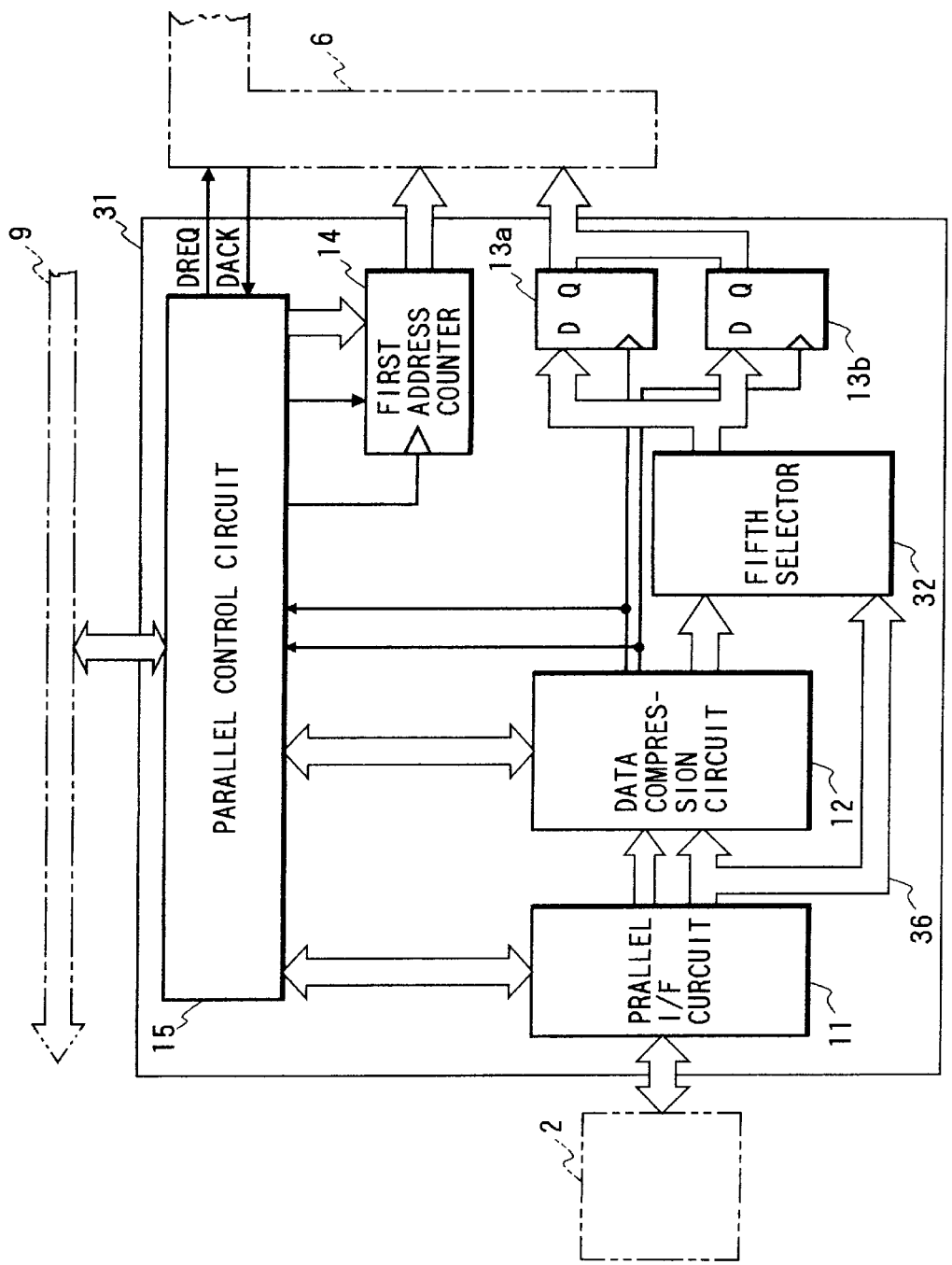
FIG. 8 is a block diagram showing the details of a parallel I/F unit according to a fourth embodiment of the invention.
Figure 9:
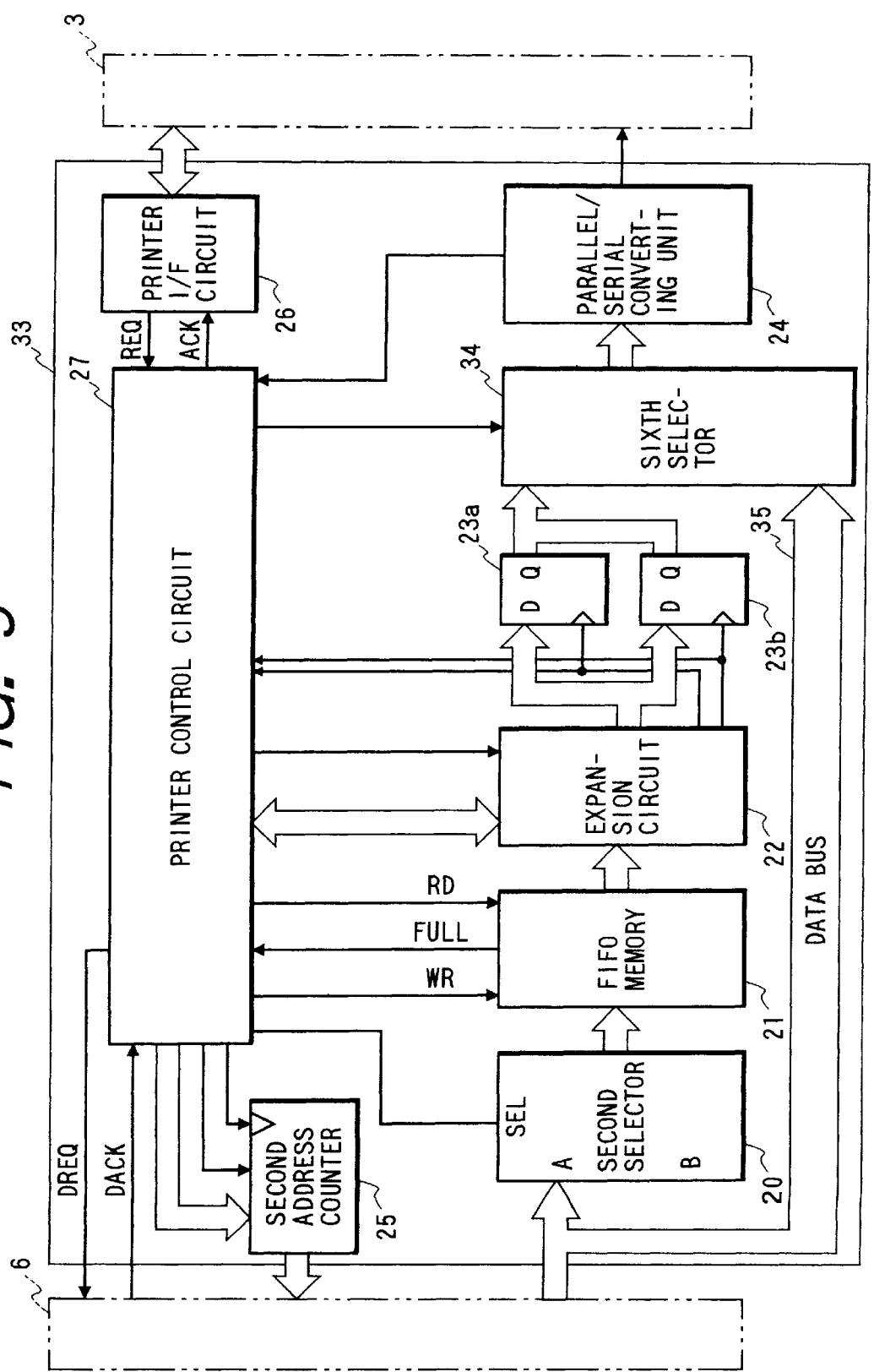
FIG. 9 is a block diagram showing the details of a printer I/F unit of the fourth embodiment.
Figure 10A:
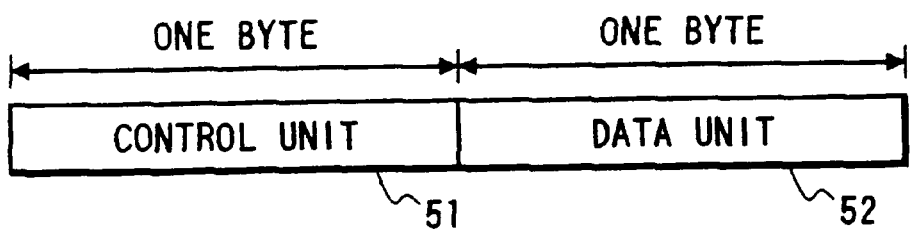
FIGS. 10A and 10B are diagrams illustrating conventional techniques.
Figure 10B:
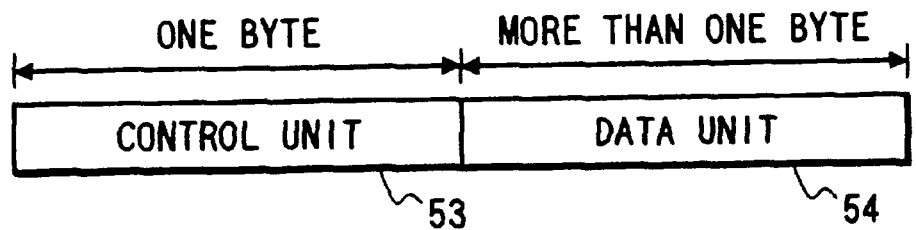

FIGS. 8 and 9 are block diagrams showing the fourth embodiment. FIG. 8 is a block diagram showing the details of a parallel I/F unit 31, and FIG. 9 is a block diagram showing the details of a printer I/F unit 33.

In the fourth embodiment, as shown in FIG. 8, a fifth selector 32 is connected between the data compression circuit 12 and the first data registers 13a and 13b. The image data is supplied from the parallel I/F circuit 11 to the fifth selector 32 via a data bus 36. Specifically, image data compressed by the host computer 2 or non-compressed data from the host computer 2 is directly written by DMA into the first data registers 13a and 13b and transferred to RAM 5. In the circuit shown in FIG. 8, if a DMA circuit is built in and image data is to be processed without the data compression circuit 12, the image data can be directly written in the first data registers 13a and 13b by using the fifth selector 32.

As shown in FIG. 9, the printer I/F unit 33 of the fourth embodiment has a sixth selector 34 connected between the second data registers 23a and 23b and the parallel/serial converting unit 24, and the image data from the arbiter 6 is input to the sixth selector 34 via a data bus 35. If non-compressed image data from the host computer 2 is directly written in RAM 5, a data request signal REQ is sent from the printer I/F circuit 26 to the printer control circuit 27 while the recording unit 3 and printer I/F circuit 26 are synchronized. The printer control circuit 27 sends a DMA request signal DREQ to the arbiter 6 to perform DMA at an address designated by the second address counter 25. When a DMA acknowledge signal DACK is received from the arbiter 6, the DMA request signal DREQ is cleared and image data is sent via the data bus 35 and sixth selector 34 to the parallel/serial converting unit 24 to output serially converted print data to the recording unit 3.

In the fourth embodiment, if the image data is compressed by the host computer, the image data is subjected to DMA via the data bus 35 and sixth selector 34. Also in this case, the expansion circuit 22 expands the image data to output print data to the recording unit 3 via the parallel/serial converting unit 24.

As described in detail, according to the present invention, even with the pack bit compression method, image data is not required to be once stored in a buffer as in conventional cases, or complicated operations such as moving an address in a reverse direction is not necessary. Therefore, the apparatus can be simplified without degrading compression/expansion functions.

If mirror-conversion is incorporated either to a compression side or to an expansion side, print data easy to read can be outputted.

What is claimed is:

1. A data processing apparatus which processes received data divided into first, second, third and fourth data of a predetermined data size, comprising:

a compressing unit adapted to cause a memory to store control data for nonrepeat data at a position subsequent to the first and second data if the first, second and third data are different from each other and if the third and fourth data are identical to each other, the control data for nonrepeat data indicating that the first and second data are formed with different data, and to cause the memory to store control data for repeat data at a position subsequent to the first data if the first and second data are identical to each other and if the second and third data are different from each other, the control data for repeat data indicating that the first and second data are formed with same data; and a decompressing unit adapted to read, from the memory, the control data for nonrepeat data and for repeat data and thereafter the first or second data.

2. A data processing apparatus according to claim 1, wherein said compressing unit causes the memory to store the control data for nonrepeat data together with data indicating a number of units of the nonrepeat data.

3. A data processing apparatus according to claim 1, wherein the memory comprises a data register, and wherein data written in the data register is transferred by DMA transfer.

4. A data processing apparatus according to claim 1, wherein said compressing unit causes the memory to store the control data for repeat data together with data indicating a number of units of the repeat data.

5. A data processing apparatus according to claim 1, wherein the received data comprise print data.

6. A data processing apparatus according to claim 1, wherein said apparatus is a print processing apparatus.

7. A data processing method which processes received data divided into first, second, third and fourth data of a predetermined data size, comprising:

a compressing steps of causing a memory to store control data for nonrepeat data at a position subsequent to the first and second data if the first, second and third data are different from each other and if the third and fourth data are identical to each other, the control data for nonrepeat data indicating that the first and second data are formed with different data, and of causing the memory to store control data for repeat data at a position subsequent to the first data if the first and second data are identical to each other and if the second and third data are different from each other, the control data for repeat data indicating that the first and second data are formed with same data; and a decompressing step, of reading, from the memory, the control data for nonrepeat data and for repeat data and thereafter the first or second data.

8. A data processing method according to claim 7, wherein said compressing step includes causing the memory to store the control data for nonrepeat data together with data indicating a number of units of the nonrepeat data.

9. A data processing method according to claim 7, wherein the memory comprises a data register, and wherein data written in the data registers are transferred by DMA transfer.

10. A data processing method according to claim 7, wherein said compressing step includes causing the memory to store the control data for repeat data together with data indicating a number of units of the repeat data.

11. A data processing method according to claim 7, wherein the received data comprise print data.

12. A data processing method according to claim 7, wherein said method is a print processing method.

* * * * *

UNITED STATES PATENT AND TRADEMARK OFFICE
CERTIFICATE OF CORRECTION

PATENT NO. : 6,215,558 B1
DATED : April 10, 2001
INVENTOR(S) : Tsutomu Kubota

It is certified that error appears in the above-identified patent and that said Letters Patent is hereby corrected as shown below:

<u>Column 1,</u>
Line 20, "same data element" should read -- same-data-element --.

<u>Column 4,</u>
Line 3, "counter" should read -- counter 25 --.

<u>Column 5,</u>
Line 1, "bytes" should read -- byte --;
Line 37, "send" should read -- sent --.

<u>Column 8,</u>
Line 16, "steps" should read -- step --; and
Line 38, "registers are" should read -- register is --.

Signed and Sealed this

Seventeenth Day of September, 2002

*Attest:*

JAMES E. ROGAN
*Attesting Officer*    *Director of the United States Patent and Trademark Office*